US012501972B2

(12) United States Patent
Christian et al.

(10) Patent No.: US 12,501,972 B2
(45) Date of Patent: Dec. 23, 2025

(54) ASSEMBLY OF A WRISTBAND TO A WATCH CASE

(71) Applicant: ROLEX SA, Geneva (CH)

(72) Inventors: Martin Christian, Belley (FR); Stéphane Dufour, Vessy (CH)

(73) Assignee: ROLEX SA, Geneva (CH)

( * ) Notice: Subject to any disclaimer, the term of this patent is extended or adjusted under 35 U.S.C. 154(b) by 509 days.

(21) Appl. No.: 17/974,352

(22) Filed: Oct. 26, 2022

(65) Prior Publication Data

US 2023/0141715 A1 May 11, 2023

(30) Foreign Application Priority Data

Nov. 5, 2021 (EP) .................................... 21206678

(51) Int. Cl.
*A44C 5/14* (2006.01)
*G04B 37/14* (2006.01)

(52) U.S. Cl.
CPC ............ *A44C 5/14* (2013.01); *G04B 37/1486* (2013.01)

(58) Field of Classification Search
CPC ...... A44C 5/14; A44C 5/147; G04B 37/1493; G04B 37/1486
(Continued)

(56) References Cited

U.S. PATENT DOCUMENTS 6,098,394 A 8/2000 Hashimoto et al.
7,730,710 B2 6/2010 Rejzner
(Continued)

FOREIGN PATENT DOCUMENTS

CH 701688 A2 * 2/2011 ........... G04B 17/325
CH 703079 B1 * 11/2011 ............... A44C 5/14
(Continued)

OTHER PUBLICATIONS

European Search Report dated Apr. 14, 2022 in priority application No. EP21206678; with English machine translation (total 15 pages).

*Primary Examiner* — Edwin A. Leon
*Assistant Examiner* — Kevin Andrew Johnston
(74) *Attorney, Agent, or Firm* — Seckel IP, PLLC

(57) ABSTRACT

The device for fixing a wristband to a watch middle includes a connecting element (11) for connection to a wristband (10) or a watch middle (20), at least one pin (1) able to occupy two positions, one projecting from the connecting element (11) and another retracted into a housing (11*a*) of the connecting element (11), and a receiving element (21) for connection to a watch middle (20) or a wristband (10), having at least one bore (21*a*). The fixing device includes at least one insert (5), and is designed to occupy at least two configurations: a first configuration in which the at least one pin (1) occupies a position retracted into the connecting element (11), enabling a wristband to be separated from a watch middle, and a second configuration in which the at least one pin (1) occupies a position projecting from the connecting element and is positioned in the at least one bore (21*a*) of the receiving element (21), the at least one insert (5) forming an interface between the at least one pin (1) and the at least one bore (21*a*) and/or the housing (11*a*) to minimize frictional wear on rotation of the at least one pin (1) relative to the receiving element (21) and/or the connecting element (11) respectively.

20 Claims, 3 Drawing Sheets

(58) Field of Classification Search
USPC .......................................................... 368/282
See application file for complete search history.

(56) References Cited

U.S. PATENT DOCUMENTS

| | | | | |
|---|---|---|---|---|
| 2006/0261106 | A1 | 11/2006 | Hiranuma et al. | |
| 2009/0113870 | A1* | 5/2009 | Rejzner .................. | A44C 5/107 59/80 |
| 2012/0198885 | A1 | 8/2012 | Bolzt et al. | |
| 2019/0125041 | A1* | 5/2019 | Nicolas .............. | G04B 37/1486 |
| 2019/0258207 | A1* | 8/2019 | Kaelin ................... | G04B 31/08 |
| 2020/0405016 | A1 | 12/2020 | Pesenti | |

FOREIGN PATENT DOCUMENTS

| | | | | |
|---|---|---|---|---|
| CH | 714646 | B1 * | 8/2020 | ............... A44C 5/14 |
| EP | 0968670 | A1 | 1/2000 | |
| EP | 2057914 | A1 | 5/2009 | |
| EP | 2484246 | A1 | 8/2012 | |

* cited by examiner

ASSEMBLY OF A WRISTBAND TO A WATCH CASE

This application claims priority of European patent application No. EP21206678.1 filed Nov. 5, 2021, the content of which is hereby incorporated by reference herein in its entirety.

BACKGROUND ART

The invention concerns a device for fixing a wristband to a watch middle. It also relates to a timepiece as such comprising at least one such fixing device, in particular a wristwatch, in which the fixing device is arranged between a wristband and a middle of the timepiece.

Various devices are used to fix a wristband in a removable and articulated manner to a middle of a wristwatch. For example, in accordance with a routine solution of the prior art a watch middle has two pairs of lugs, each pair of lugs delimiting a housing to receive a link arranged at the end of a wristband. A pin extending between the two lugs of a pair of lugs comes into engagement with this link of the wristband, retaining it in position between these two lugs, whilst enabling relative articulation of the wristband and the watch case by pivoting about this pin.

This way of fixing a wristband to a watch case, in particular to a middle, must ideally achieve the following objectives:

- It must be reliable, more particularly to prevent any unintended detachment of the wristband;
- It must be robust, and in particular prevent any wear that would deteriorate its functionality over time;
- It must enable user-friendly removal and fixing of a wristband, for example enabling its easy and rapid replacement;
- It must have an attractive esthetic appearance, and in particular must be compatible with the esthetic requirements of top of the range timepieces.

SUMMARY OF THE INVENTION

Existing solutions achieve at least some of the foregoing objectives but remain open to improvement. Thus an objective of the present invention is to improve on this situation.

Thus a general object of the invention is an improved solution for fixing a wristband to a watch middle, more generally to a watch case.

To be more precise, a first object of the invention is a reliable and robust solution for fixing a wristband to a watch case.

A second object of the invention is a user-friendly solution for fixing a wristband to a watch case.

A third object of the invention is preferably an esthetic solution for fixing a wristband to a watch face.

To this end the invention is based on a device for fixing a wristband to a watch middle, comprising a connecting element intended for connection to a wristband or to a watch middle, respectively, at least one pin able to occupy two positions, a position projecting from the connecting element and a position retracted into a housing of the connecting element, and a receiving element intended for connection to a watch middle or to a wristband, respectively, comprising at least one bore, and wherein the fixing device comprises at least one insert, the fixing device being designed to occupy at least two configurations:

- a first configuration in which the at least one pin occupies a position retracted into the connecting element, enabling a wristband to be separated from a watch middle, and
- a second configuration in which the at least one pin occupies a position projecting from the connecting element and is positioned in the at least one bore of the receiving element, the at least one insert forming an interface between said at least one pin and said at least one bore and/or said housing to minimize frictional wear on rotation of said at least one pin relative to the receiving element and/or to the connecting element, respectively.

The invention is more precisely defined by the claims.

BRIEF DESCRIPTION OF THE DRAWINGS

These objects, features and advantages of the present invention will be explained in detail in the following description of one particular embodiment given by way of non-limiting example and with reference to the appended figures, in which.

DETAILED DESCRIPTION OF PARTICULAR EMBODIMENTS

To simplify the description of the invention corresponding or identical elements in different variant embodiments bear the same references.

The invention is therefore based on a device for fixing a wristband to a watch middle, more generally to a watch case. This fixing device comprises two complementary main elements, namely a connecting element and a receiving element, respectively arranged on a wristband and on a watch case, or vice-versa. These connecting and receiving elements are intended to be removably fixed to one another, as will be explained hereinafter.

Figure 1:
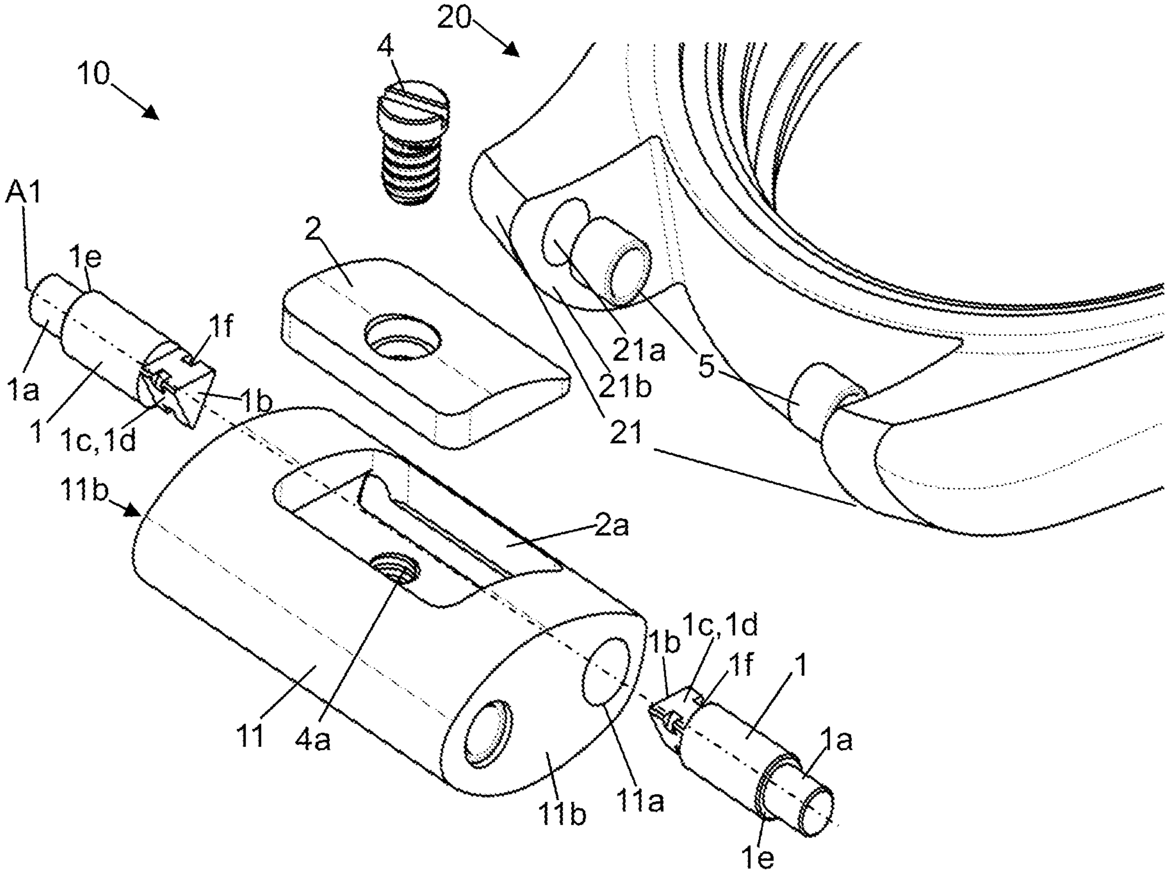
FIG. 1 represents an exploded perspective view of the device in accordance with one embodiment of the invention for fixing a wristband to a watch middle.
Figure 2:
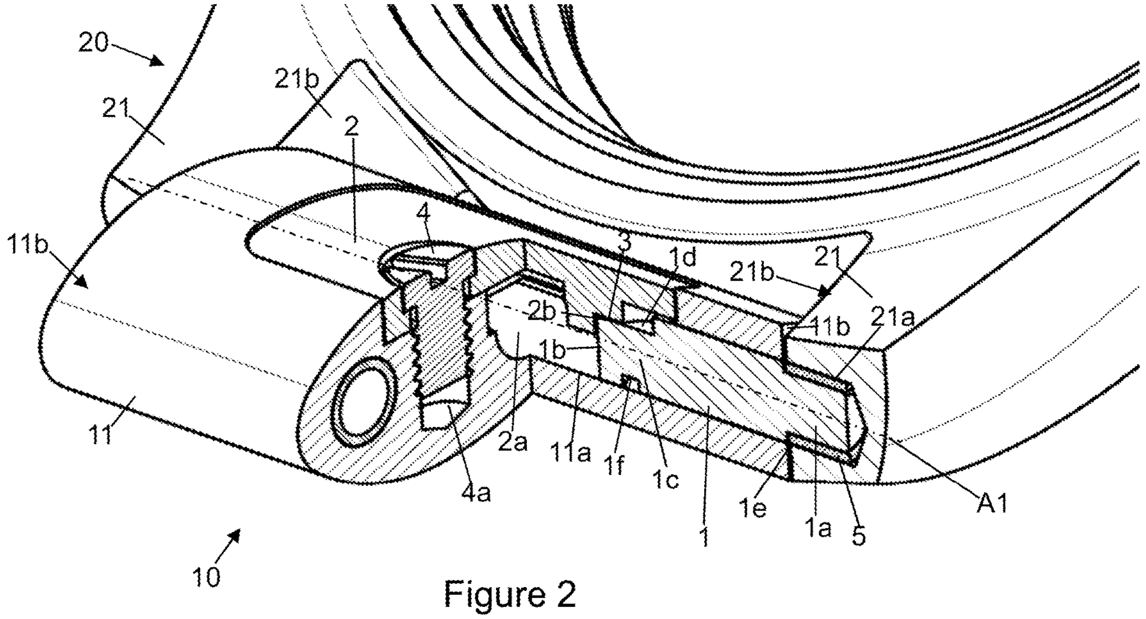
FIG. 2 represents a partially truncated perspective view of a device in accordance with the embodiment of the invention for fixing a wristband to a watch middle in a configuration for fixing the wristband.
Figure 3:
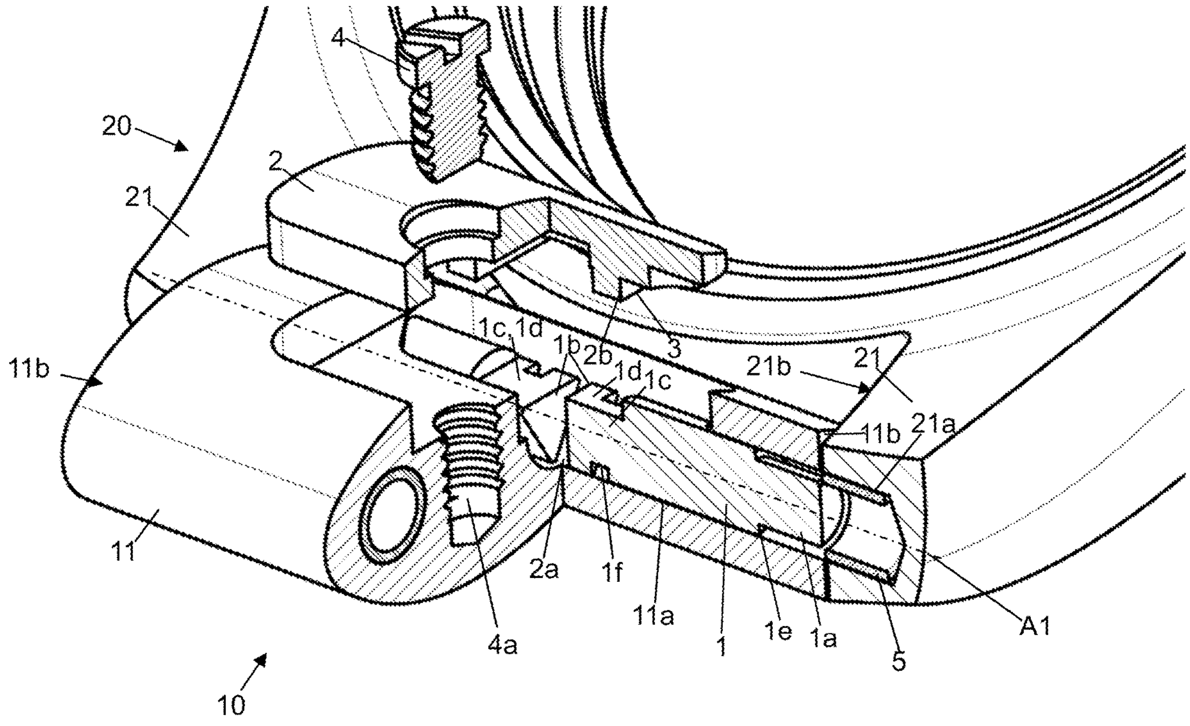
FIG. 3 represents a perspective view of the fixing device in accordance with the embodiment of the invention including pins in retracted position.

FIGS. 1 to 3 show an embodiment of the invention in which a connecting element 11 takes the form of a wristband link forming a connecting link. This connecting link is intended to be disposed at the end of a wristband 10. It advantageously has the same shape and the same appearance as the other wristband links.

In this embodiment the fixing device further comprises a receiving element 21 that takes the form of two substantially parallel lugs arranged face to face on a middle 20. Each lug comprises a bore 21*a* that in particular takes the form of a blind hole. The respective bores 21*a* of the two lugs are arranged along axes that are preferably substantially aligned. The bores preferably have a circular cross-section. The openings of the two bores are oriented toward one another. The space between the two lugs defines a housing intended to be occupied by the connecting link of the wristband. The visible exterior surface of the lugs is not modified in any way, with no discontinuity that would come to degrade its appearance. Nevertheless, as an alternative, the two bores could feature through-holes and/or be provided with bearing surfaces and/or have orientations that are not parallel to one another.

The fixing device further comprises two pins 1 intended to fix or not to fix the connecting element 11 to the receiving element 21. Each pin 1 is able to occupy two positions, a position projecting from the connecting element 11, as represented in FIG. 2, and a position retracted in a housing 11*a* of the connecting element 11, as represented in FIG. 3, as will be explained hereinafter.

The fixing device is therefore designed to occupy at least two configurations:

- a first configuration in which the pins 1 occupy a position retracted into the connecting element, enabling a wristband link to be separated from a watch middle, and
- a second configuration in which the pins 1 are held in a position projecting from the connecting element 11 and are positioned in the respective bores 21*a* of the receiving element 21 so as therefore to fix between them the connecting element 11 and the receiving element 21 and therefore to connect a wristband to a watch middle.

Each pin 1 is positioned in a housing 11*a* in the connecting element 11. Two housings 11*a* preferably extend along the same axis A1. Moreover, the housings 11*a* take the form of a transverse through-hole. This hole therefore opens onto the two opposite side walls or flanks 11*b* of the connecting element. Each housing 11*a* enables a pin 1 to slide freely along the axis A1 with one degree of freedom in movement in translation. This degree of freedom in movement in translation enables the pins 1 to be positioned so as to project from or to be retracted into the flanks 11*b* of the connecting element 11 so as to enable assembly and demounting of the connecting element 11, respectively. As an alternative, each of the housings 11*a* could take the form of a blind hole opening onto the flanks 11*b* and/or be provided with bearing surfaces.

The connecting element 11 further comprises a recess 2*a* extending from a wall of the connecting element 11 and opening into at least a part of the housings 11*a* of the pins so that the pins 1 can be manipulated by an operator in this recess 2*a*. In this embodiment an attached element 2 that takes the form of a cover is intended to be placed in the recess 2*a*. When it is positioned in this recess the attached element 2 cooperates with the pins 1, as will be described hereinafter. A fixing element 4 such as a screw enables the attached element 2 to be fixed in the housing 2*a* of the connecting element 11. To this end the connecting element 11 comprises an internal screwthread 4*a*. The attached element 2 is preferably demountable. Moreover, the attached element 2 advantageously has a shape complementary to that of the recess 2*a*, in particular a volume corresponding or substantially corresponding to that of the recess 2*a*, so that when it is fixed to the connecting element 11 its visible surface espouses (or conforms to) the adjoining surface of the connecting element 11 and/or of the receiving element 21 to form a substantially continuous surface. By virtue of this arrangement the attached element 2 may be conformed to the fixing device and optimize the esthetic appearance of the connecting element 11 and/or of the receiving element 21. In addition, the attached element 2 is preferably disposed on the side of the connecting element 11 that cannot be seen. For example, it is provided on the face of the connecting link intended to come into contact with the wrist of the wearer. As an alternative the attached element may take some other form, and may in particular project from the connecting element 11 and/or from the receiving element 21. In a further variant it may be fixed to the connecting element by any other means, such driving it in, gluing it, clipping it, welding it, brazing it, etc. It is therefore not necessarily removable, in which case the wristband will not be demountable once fastened to a middle. As will be explained hereinafter, in another variant the attached element may consist of a plurality of parts and/or be disposed in the receiving element 21. Consequently, the recess 2*a* may also consist of a plurality of parts and/or be disposed in the receiving element 21 in at least parts of the housings 21*a* of the pins. Of course, the fixing means of the attached element or elements will need to be adapted and/or rearranged accordingly in the receiving element.

In this embodiment each pin 1 has exactly the same shape and is arranged in a symmetrical manner in the connecting element 11. This connecting element 11 has a shape that is substantially symmetrical with respect to a median plane perpendicular to the axis A1. Each pin 1 has a cylindrical central portion, a first functional portion oriented toward the exterior of the connecting element 11, which has a cylindrical shape, and a second functional portion oriented toward the interior of the connecting element 11, which has a plurality of functional surfaces. The first and second portions of each pin 1 are arranged on respective opposite sides of the central portion. Each pin 1 is mobile in translation in a housing 11*a* of the connecting element so that it is able to occupy a projecting position in which at least first portion projects from the flank 11*b* of the connecting element and is therefore able to take up its place in a bore 21*a* of the receiving element 21. The first portion is thus intended to form a pivot 1*a* about which the receiving element 21 is mobile in rotation relative to the connecting element 11.

Each pin 1 further comprises functional surfaces in its second portion opposite the first portion. In particular, the first internal end of each pin 1 in this second portion forms an abutment surface or stop 1*b*. The attached element 2 comprises at least one first surface that defines an axial first abutment or stop 2*b* intended to cooperate with this stop 1*b* of each pin 1 in order to hold it in position projecting from the flanks 11*b* of the connecting element 11 when the attached element 2 is fixed to the connecting element 11. In other words, when the attached element 2 is fixed to the connecting element 11 its first surfaces come into engagement with the stop 1*b* of each respective pin 1 in the projecting position, thus preventing the pins 1 from moving so as to retract from the flanks 11*b* of the connecting element 11, with the result that the pins 1 continue to project.

Additionally, the second portion of each pin 1 comprises a non-cylindrical portion 1*c* that is intended to cooperate with a complementary portion 3 of the attached element 2 visible in FIG. 2 so as to prevent any rotation of a pin 1 about the axis A1 in the presence of an attached element 2. In the embodiment shown the non-cylindrical portion 1*c* of the pins 1 has a triangular section formed of three surfaces 1*d*, one or the other of these surfaces being intended to cooperate with the complementary portion 3 of the attached element 2, which thus forms a second abutment 3 preventing rotation of each of the pins 1. This rotation second abutment 3 in the attached element 2 therefore makes it possible to immobilize each pin 1 in rotation relative to the connecting element 11. The non-cylindrical portion 1*c* could alternatively for example have a square, three-lobe or half-moon section. Alternatively the rotation second abutment 3 of the pins 1 could also be arranged in the connecting element 11 and not on the attached element 2. In a variant of this kind the rotation second abutment of the connecting element could cooperate with the pins 1 only in their projecting position or alternatively also in their retracted position. In a further variant the rotation second abutment 3 of the pins 1 could also be arranged in the bores 21*a* so that it cooperates with the pins 1 only in their projecting position. Moreover, the different functional portions of the pin 1 could be arranged in any other manner enabling fixing in accordance with the invention. For example, in another design variant the stop 1*b* could be on the same portion as the pivot 1*a*, opposite another portion where the non-cylindrical portion 1*c* would be situated. Of course, this example is not limiting on the invention. Some of the possible variants will be specified hereinafter.

To summarize, in this embodiment, in the absence of the attached element 2, each pin 1 has two degrees of freedom relative to the connecting element 11: a movement in translation along the axis A1 and a rotation on itself about that same axis A1. The fixing of the attached element when the pins 1 are in their position projecting from the connecting element 11 enables these two degrees of freedom to be eliminated, the pins 1 then remaining immobilized in their projecting position and no longer being able to turn on themselves in the housings 11*a* of the connecting element 11.

The operation of the fixing device in accordance with the embodiment of the invention will now be explained. When the device is in its fixing configuration, as shown in FIG. 2, an operative can remove the attached element 2 by unscrewing the screw 4. They thus gain access to the recess 2*a* in the connecting element and to the second functional portions of the two pins 1 disposed at least partly in this recess. The operative can then move the pins in translation to move them inside the recess 2*a* from their projecting position to their retracted position. To assist this operation each pin 1 preferably comprises a notch or a groove if at the level of its second functional portion, which enables the insertion of a simple tool, such as a pin or tweezers, to guide the retraction movement in translation of the two pins manually. Of course, any other means or tools enabling actuation of the two pins may be envisaged, such as magnets, for example. When this operation is completed the first functional portions of each pin 1, in particular their pivots 1*a*, are housed in the connecting element 11 and free of the bores 21*a* in the receiving element 21. The connecting element 11 can then be detached from the receiving element 21. The reverse operation enables the two elements to be fastened together.

To reduce frictional wear surfaces of the articulation relative to the connecting and receiving elements the pins 1 and/or the receiving surfaces of the receiving element 21 and/or the receiving surfaces of the connecting element 11 receiving the pins 1 may preferably be made of a material for limiting frictional wear, such as a sintered ceramic, advantageously based on zirconia.

Nevertheless, in accordance with the embodiment, it is required to be able to make the middle, including its lugs, and therefore the receiving element 21 and/or the connecting element 11 of metal, in particular of a precious metal, such as gold or platinum, to be able to obtain the required esthetic finish. Similarly, the pins may be made of steel or of precious metal. Of course, other materials may be envisaged, such as composite materials.

For this reason the invention uses inserts 5 that form an interface at the friction surfaces of the fixing device. In the embodiment described this friction surface is positioned at the interface between the pivots 1*a* formed in the first portion of the pins 1 and the bores 21*a* of the receiving element. In this embodiment the inserts 5 therefore preferably take the form of a tube or a bearing. They may or may not be fixed into the bore 21*a*. Alternatively, they may or may not be fixed to the first functional portion of the pins 1. In another variant design said friction surfaces could be positioned at the interface between the housings 11*a* and the pins 1, for example between the pivots 1*a* and the housings 11*a* of the connecting element. In this variant the inserts could optionally be fixed in the housing 11*a*. Alternatively, they may optionally be fixed to the pins 1 in their zone rubbing (of friction) on the housings 11*a*.

An insert may advantageously be made of a sintered ceramic or of a composite material, formed for example of a mixture of a ceramic and a metal, or a polymer (a thermoplastic for example). An insert may be made entirely or partly from a material of this kind. For example, a material of this kind may form a simple coating. An insert 5 advantageously has a hardness greater than or equal to 800 HV.

Moreover, in the embodiment described the pivots 1*a* formed in the first portion of the pins 1 comprise a bearing surface defining an axial abutment 1*e* between said pivots and the inserts 5 so as to prevent contact and consequent wear between the flanks 11*b* of the connecting element 11 and the lateral walls 21*b* of the receiving element 21.

The invention is naturally not limited to the precise geometry of the various elements represented. Thus the pivot 1*a* of a pin 1 could have other shapes enabling the articulation of the two elements of the fixing device. For example the pivot 1*a* could be conical or truncated conical. Of course, the geometry of the inserts 5 could be adapted accordingly and therefore be complementary to the geometry of the pins.

In the embodiment described the pins are preferably constrained to rotate with the connecting element 11 so that the friction surfaces of the articulation are localized at the contacts between the pins 1 and the bores 21*a* of the receiving element and more particularly between the pins 1 and the inserts 5. Of course, the opposite is also possible, with the pins constrained to rotate with the receiving element 21 so that the friction surfaces of the articulation are localized at the contact between the pins 1 and the housings 11*a* of the connecting element and more particularly between the pins 1 and the inserts 5.

The invention is not limited to the embodiment described and may incorporate numerous variants. To this end, FIGS. 4 to 7 represent a few variant embodiments of the invention for which only the specific features of those variants are described.

Figure 4:
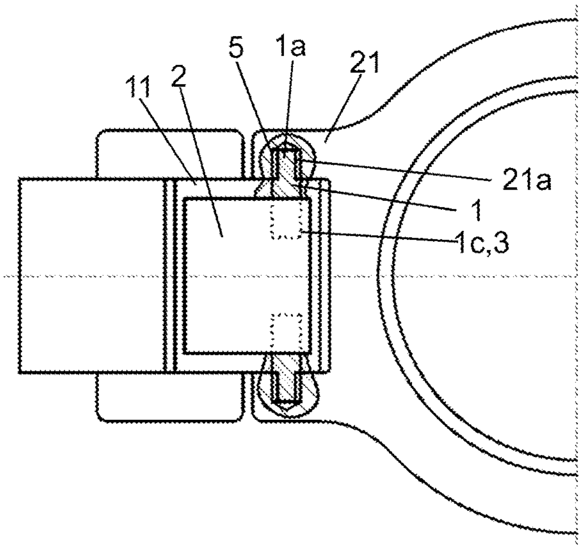
FIGS. 4 to 7 represent views from above of variant embodiments of the fixing device in accordance with the embodiment of the invention.

For example, as described above an attached element 2 may take different forms. FIG. 4 thus represents a view from above of an embodiment that corresponds to the embodiment described above with reference to FIGS. 1 to 3 in which the attached element 2 occupies a large area of the connecting element 11.

Figure 6:
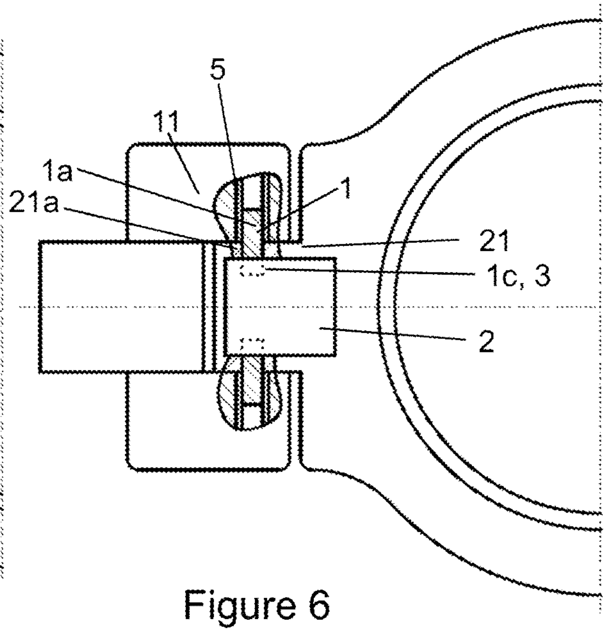
Figure 7:
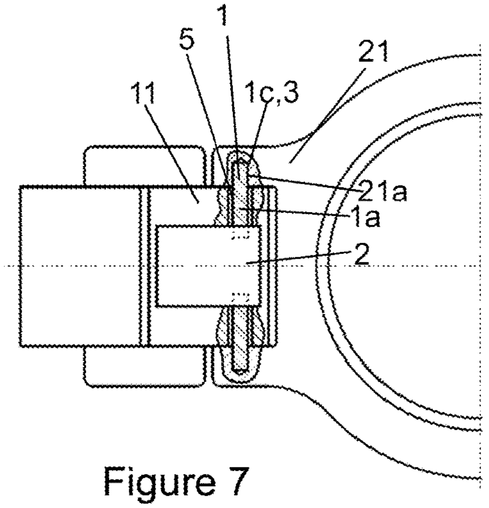

Alternatively, the pins 1 may be prevented from rotating relative to the receiving element 21, the connecting element 11 then being mobile in rotation relative to the pins 1. In a variant of this kind the inserts 5 form an interface between the pins and the connecting elements, as represented by the variants from FIGS. 6 and 7 described hereinafter. The inserts 5 are therefore housed in the connecting element 11. Moreover, the pins may for example comprise non-circular first portions, for example similar to the non-cylindrical portion 1*c* described above, intended to be housed in a receiving element 21 in the projecting configuration. In particular the pins 1 could equally have a geometry substantially reversed with respect to the pins described above, the first portion forming a pivot being housed inside the housing of the connecting element, the non-cylindrical portion being oriented toward the exterior of the connecting element, intended to occupy a projecting position in a receiving element in a fixing configuration. As a further alternative the portion of the pins forming a pivot may correspond to the central position of the pins. FIG. 7 shows one such embodiment diagrammatically.

In accordance with a further variant an attached element could be provided on a receiving element to cooperate with a pin at the level of the receiving element. This cooperation may consist in blocking at least one degree of freedom of said pin, for example in movement in translation, to retain it in the projecting position, and/or in movement in rotation. In one variant a single attached element or a plurality of attached elements could cooperate with the connecting element and/or the receiving element. For example, a first attached element could comprise an axial first abutment and a second attached element could comprise a rotation second abutment. These first and second attached elements could be arranged in the connecting element and in the receiving element, respectively, or vice-versa.

Figure 5:
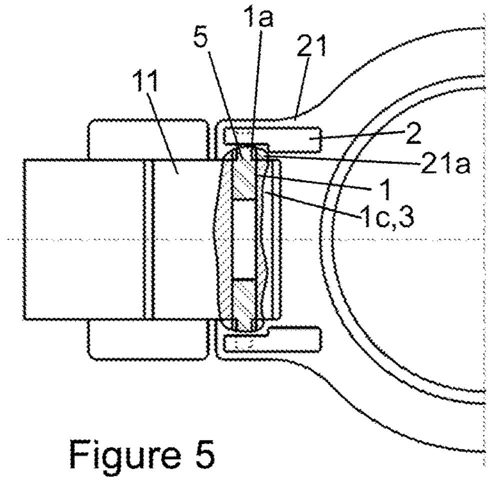

For example, in this variant an attached element can therefore be fixed to each of the lugs of the middle 20. FIG. 5 shows a variant of this kind in which each facing lug of the middle comprises an attached element 2 removably mounted on each lug and arranged to cooperate with a pin so as to maintain its position projecting from a connecting element, that is to say to prevent its movement in translation of retraction into the connecting element. In this variant shown in FIG. 5 each pin 1 is immobilized in rotation relative to the connecting element by said connecting element, by means of a rotation second abutment 3, when it is at least in its projecting position, the rotation of each lug relative to each pin being achieved by means of an insert housed in each lug.

In a further variant, the receiving element arranged on the middle could not have the shape with two lugs, but for example the shape of a single lug. In this variant the connecting element 11 arranged at the end of the wristband could take the form of two complementary and distinct lateral elements each incorporating a pin 1, these two pins 1 being destined to come into position on either side of the single lug to fix a wristband onto a middle. FIG. 6 shows this kind of embodiment in a fixing configuration. An attached element 2 is arranged on the receiving element in the form of a single lug and each lateral element of the connecting element comprises a projecting pin extending in a bore of the single lug. The attached element 2 immobilizes these pins in their projecting position and in rotation relative to the receiving element. Each lateral element of the connecting element remains mobile in rotation relative to its respective pin and incorporates an insert 5 between the pin 1 and the housing receiving it. Finally, the middle can therefore comprise at least one lug, in particular one or two lugs. Any other middle architecture can be envisaged, in particular one comprising an element of the fixing device of the invention that does not necessarily take the form of one or more lugs.

In another variant the fixing device may comprise one pin 1. The fixing device thus comprises at least one pin. In another variant the at least one pin is not mobile in translation relative to the connecting element. In fact, it can be moved between its retracted position and its projecting position by any other movement, for example a rotation, or a combination of movements in translation and rotation. Additionally, it may finally be moved with one, two or more degrees of freedom relative to the connecting element, that or those degrees of freedom possibly being reduced in its projecting position.

As mentioned above, in accordance with one embodiment the connecting element is disposed at the end of a wristband. When the latter comprises an assembly of links, in particular metal links, the connecting element advantageously takes the form of a connecting link that has a shape identical or similar to that of other links of the wristband to give a continuous esthetic appearance. In a variant embodiment the wristband may be made of a flexible material, for example leather. In this case the connecting element can be integrated into the end of the flexible wristband, preferably in a manner that is totally or partly concealed. Alternatively, it may take the form of a metal end-piece arranged at the end of the flexible wristband.

In a further variant the connecting element is disposed on a watch case, in particular on a middle, and a receiving element is disposed on a wristband. For example the construction of the fixing device of the variants illustrated by FIGS. 4 to 7 could be reversed. That is to say, in all of those figures the receiving element 21 could be a link and the connecting element 11 could be one or more lugs of a middle.

In all the variants described an insert could be positioned between the same pin and both the connecting element and the receiving element, an insert thus being able to surround the pin in whole or in part. A variant of this kind enables the best reduction of wear.

In a complementary way, in all the variants the attached element may comprise a means for acting on a pin during positioning thereof in a recess and/or during its retraction from the connecting member and/or from the receiving member so as to drive said pin in translation to move it automatically from its retracted position to its projecting position and/or vice-versa.

In all variants, the attached element is advantageously removable. Advantageously also, the fixing device is in the first configuration enabling a wristband to be separated from a watch middle when the attached element is removed, and the fixing device is in the second configuration when the attached element is fixed to the device.

In all variants, the pin is preferably made of ceramic, particularly in sintered ceramic, advantageously based on zirconia.

The invention also relates to a timepiece as such, in particular a wristwatch, comprising at least one fixing device as described. A fixing device of this kind is advantageously disposed on each side of the watch case, in particular of the middle, for the removable fixing of each end of the wristband.

The invention claimed is:

1. A fixing device for fixing a wristband to a watch middle, comprising:

a connecting element adapted for connection to one of the wristband or the watch middle, at least one pin able to occupy a first position projecting from the connecting element and a second position retracted into a housing of the connecting element, a receiving element adapted for connection to the other of the watch middle or the wristband, the receiving element comprising at least one bore, and at least one insert, the fixing device being designed to occupy at least a first configuration and a second configuration, wherein:

in the first configuration, the at least one pin occupies a position retracted into the connecting element, enabling the wristband to be separated from the watch middle, and in the second configuration, the at least one pin occupies a position projecting from the connecting element and is positioned in the at least one bore of the receiving element, the at least one insert forming an interface between the at least one pin and the at least one bore and/or the housing to minimize frictional wear on rotation of the at least one pin relative to the receiving element and/or to the connecting element, respectively, wherein, in the first configuration of the fixing device, the at least one pin is free to rotate relative to the connecting element, and in the second configuration of the fixing device, the at least one pin is immobilized in rotation relative to the connecting element or relative to the receiving element.

2. The fixing device as claimed in claim 1, wherein the at least one bore of the receiving element and/or the housing of the connecting element has a form of a blind hole.

3. The fixing device as claimed in claim 1, comprising at least one attached element, so that in the second configuration of the fixing device the attached element is fixed to the connecting element and/or to the receiving element and cooperates with the at least one pin to retain the at least one pin in the first position projecting from the connecting element.

4. The fixing device as claimed in claim 3, wherein the at least one attached element features at least one axial first stop that cooperates with a first stop of the at least one pin in the second configuration so as to prevent the at least one pin from moving in translation in the housing and to retain the at least one pin in the first position projecting from the connecting element.

5. The fixing device as claimed in claim 1, wherein the connecting element or the receiving element (i) cooperates with the at least one pin in the retracted first position to prevent rotation of the at least one pin relative to the connecting element or relative to the receiving element, and/or (ii) cooperates with the at least one pin in the projecting second position to prevent rotation of the at least one pin relative to the connecting element or relative to the receiving element.

6. The fixing device as claimed in claim 5, wherein the connecting element or the receiving element has at least one complementary portion that (i) cooperates with a non-cylindrical portion of the at least one pin in the retracted first position so as to prevent the at least one pin from being moved in rotation relative to the connecting element or relative to the receiving element, and/or (ii) cooperates with a non-cylindrical portion of the at least one pin in the projecting second position so as to prevent the at least one pin from being moved in rotation relative to the connecting element or relative to the receiving element.

7. The fixing device as claimed in claim 3, wherein the connecting element has a recess in which is located at least a portion of the housing and/or the receiving element has a recess in which is located at least a portion of the bore, and the at least one attached element has a form of a cover that has a volume corresponding or substantially corresponding to a volume of the recess so that in the second configuration the at least one attached element occupies the recess, wherein a visible surface of the at least one attached element conforming to an adjoining surface of the connecting element and/or of the receiving element to form a substantially continuous surface.

8. The fixing device as claimed in claim 1, wherein the at least one insert has a hardness greater than or equal to 800 HV.

9. The fixing device as claimed in claim 1, wherein the at least one insert is made in whole or in part, or comprises a coating of, a material selected from the group consisting of sintered ceramics, composite materials, and polymers.

10. The fixing device as claimed in claim 1, wherein the at least one insert has a form of a tube or a bearing.

11. The fixing device as claimed in claim 1, wherein:

the connecting element is a connecting link designed for fixing to the end of the wristband and the receiving element comprises at least one lug designed to be fixed to the middle so that the at least one pin of the connecting link is housed in the bore of the at least one lug using the insert forming the interface of the fixing device; or the connecting element is at least one lug designed for fixing to the middle and the receiving element is a connecting link designed to be fixed to an end of the wristband so that the at least one pin of the lug is housed in the bore of the connecting link using the insert forming the interface of the fixing device.

12. The fixing device as claimed in claim 1, wherein the at least one pin is made of ceramic.

13. A timepiece comprising at least one fixing device as claimed in claim 1 for removably fixing at least one end of the wristband to the middle, the wristband comprising a connecting link that is the connecting element of the fixing device, the connecting link being designed to cooperate with at least one lug that is the receiving element of the fixing device arranged on the middle so that the at least one pin of the connecting link is housed in the bore (of the at least one lug using the insert forming the interface of the fixing device, or the middle comprising at least one lug that is the connecting element, the at least one lug being designed to cooperate with a connecting link of a wristband that is a receiving element so that the at least one pin of the at least one lug is housed in the bore of the connecting link using the insert forming an interface in the second configuration of the fixing device.

14. The fixing device as claimed in claim 9, wherein the at least one insert is made in whole or in part, or comprises a coating of, a mixture of a ceramic and a metal.

15. The fixing device as claimed in claim 9, wherein the at least one insert is made in whole or in part, or comprises a coating of, a thermoplastic material.

16. The fixing device as claimed in claim 10, wherein the tube or bearing is fixed in a bore of the receiving element or of the housing of the connecting element or fixed to at least one pin of the fixing device.

17. The fixing device as claimed in claim 12, wherein the at least one pin is made of sintered ceramic.

18. The fixing device as claimed in claim 17, wherein the sintered ceramic is based on zirconia.

19. The fixing device as claimed in claim 1, wherein, in the second configuration, the pins are immobilized in rotation relative to the connecting element.

20. The fixing device as claimed in claim 6, wherein the non-cylindrical portion of the at least one pin and an abutment surface of the attached element are positioned in the at least one bore of the connecting element and/or in the at least one bore of the receiving element.

* * * * *